(12) United States Patent
Griggs et al.

(10) Patent No.: US 12,036,497 B2
(45) Date of Patent: Jul. 16, 2024

(54) GAS-LIQUID SEPARATOR AND METHOD AND AIR COMPRESSOR SYSTEM EQUIPPED THEREWITH

(71) Applicant: Vanair Manufacturing, Inc., Michigan City, IN (US)

(72) Inventors: Garrett M. Griggs, Laporte, IN (US); Kai Justice, Wheatfield, IN (US); Jeff Scott Rohl, Three Oaks, MI (US); John G. Chappell, Michigan City, IN (US); Ralph Kokot, Crown Point, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 540 days.

(21) Appl. No.: 17/318,481

(22) Filed: May 12, 2021

(65) Prior Publication Data
US 2022/0364563 A1    Nov. 17, 2022

(51) Int. Cl.
*B01D 45/12*   (2006.01)
*B01D 21/00*   (2006.01)
*B01D 45/00*   (2006.01)
*B04C 11/00*   (2006.01)
*F04C 29/02*   (2006.01)

(52) U.S. Cl.
CPC ......... *B01D 45/12* (2013.01); *B01D 21/0042* (2013.01); *B01D 45/00* (2013.01); *B04C 11/00* (2013.01); *F04C 29/026* (2013.01)

(58) Field of Classification Search
CPC .... B01D 45/12; B01D 45/00; B01D 21/0042; F04C 29/026; B04C 11/00
See application file for complete search history.

(56) References Cited

U.S. PATENT DOCUMENTS

| | | | |
|---|---|---|---|
| 4,329,159 A | 5/1982 | Bull | |
| 4,539,023 A * | 9/1985 | Boley | E21B 43/36 96/184 |
| 5,132,011 A | 7/1992 | Ferris | |
| 6,315,898 B1 | 11/2001 | Bull | |
| 7,531,099 B1 | 5/2009 | Rhodes | |
| 8,470,080 B1 * | 6/2013 | Ball, IV | B01D 21/2405 95/24 |
| 8,894,755 B2 * | 11/2014 | Bruun | B01D 19/0042 96/182 |
| 9,233,329 B2 * | 1/2016 | Firnhaber | B01D 46/003 |
| 9,649,584 B2 * | 5/2017 | Burns | B01D 46/64 |

(Continued)

*Primary Examiner* — Youngsul Jeong
(74) *Attorney, Agent, or Firm* — Hartman Global IP Law; Gary M. Hartman; Domenica N. S. Hartman (57) ABSTRACT

A gas-liquid separator and method and air compressor system. The gas-liquid separator includes a separator tank having wet side and dry side chambers. The wet side chamber separates and collects liquids from pressurized air that enters through a tank inlet. A separation valve inlet port connects the wet side chamber with the dry side chamber and allows moist air to pass from the wet side chamber to the dry side chamber and prevents collected liquids from passing from the wet side chamber to the dry side chamber. A separation valve assembly opens the separation valve inlet port when pressurized air is forced into the wet side chamber and a pressure is met and/or exceeded and to close the separation valve inlet port when pressurized air is not being forced into the wet side chamber and pressure falls below the pressure.

31 Claims, 2 Drawing Sheets

(56) References Cited

U.S. PATENT DOCUMENTS

| | | | |
|---|---|---|---|
| 10,179,307 B2* | 1/2019 | De Piero | F24F 3/1405 |
| 2002/0104296 A1* | 8/2002 | Cook | F04C 23/00 55/467 |
| 2013/0341333 A1 | 12/2013 | Herdman et al. | |

* cited by examiner

FIG. 1

GAS-LIQUID SEPARATOR AND METHOD AND AIR COMPRESSOR SYSTEM EQUIPPED THEREWITH

BACKGROUND OF THE INVENTION

This application relates generally to apparatus and methods adapted to separate liquids from gases, including but not limited to gas-liquid separators for use within pressurized systems, for example, an air compressor system.

An oil-flooded rotary screw air compressor system generates a stream of compressed air that is mixed with oil. Typically, however, it is desired that compressed air discharged from the air compressor system for use in work tools or other end uses be free of any oil or other liquids. Therefore, the air compressor system usually includes a gas-liquid separator, such as a separator tank, to remove the oil and/or other liquids from the compressed air before being discharged into an end-user system, such as a compressed air line in a shop or factory. The gas-liquid separator typically includes a separator tank divided into a wet side chamber that receives the air/oil mixture from the air compressor and a dry side chamber for which dry compressed air is discharged out of the separator tank through the tank discharge outlet. In the wet side chamber, almost all of the oil is separated from the air by gravity and/or velocity changes, and slightly moist air is transferred to the dry side chamber while the oil and/or other liquid is collected in a liquid sump area for return to the air compressor. In the dry side chamber, remaining oil and/or moisture from liquid is removed from the air, and the dry air is subsequently discharged through the tank discharge outlet into the end-user system.

Such systems can experience unfavorable operating conditions during transportation of the gas-liquid separator and during stop-start cycling of the air compressor system. For example, during transportation, the gas-liquid separator will undergo changes in velocity and acceleration, which may cause the collected oil or other liquid inside the gas-liquid separator to slosh around. This sloshing may cause oil or other liquid to move from the wet side chamber of the separator tank to the dry side chamber of the separator tank. If this occurs, during start-up of the air compressor system, some of the oil or other liquid in the dry side chamber may be carried over through the tank discharge outlet to the end-user system. This may be unfavorable because it may lead to the user seeing oil or other liquid coming out of the air discharge hose, oil or other liquid in the moisture separator trap, and/or oil or other liquid coming out of drain and/or bleed orifices in the system. In another example, when an oil-flooded rotary screw air compressor system is turned off, the air compressor system typically needs to complete a "blowdown cycle" prior to being restarted, during which pressure within the entire air compressor system is dissipated, including inside of the gas-liquid separator. Restarting the system prior to completion of the blowdown cycle can cause an excessive workload on the drive unit to the compressor system and may cause undesirably high stresses on the mechanical components of the compressor pump. In addition, during the blowdown cycle, the entire system typically depressurizes slowly, and small pressurized air bubbles in the accumulated oil or other liquid in the wet side chamber of the separator tank become larger as they depressurize. This may create lots of foam. If the accumulated oil or other liquid in the wet side chamber of the separator tank depressurizes faster than the foam bubbles can pop, the foam will fill the wet side chamber of the separator tank, and foam may surge into the dry side chamber of the separator tank.

The inventors have concluded that in some arrangements it would be desirable to have a gas-liquid separator that prevents migration of liquid from the wet side chamber to the dry side chamber during transport. The inventors have also concluded that in some arrangements it would be desirable to have a gas-liquid separator that allows the air compressor system to dissipate pressure immediately, or at least extremely rapidly, so that the blowdown cycle lasts only a very short period of time, thereby allowing safe rapid restarting of the air compressor system.

BRIEF SUMMARY OF THE INVENTION

The systems, equipment, and methods disclosed hereinafter provide in some arrangements an improved arrangement to prevent collected fluids in the wet side chamber of a gas-liquid separator from spilling into the dry side chamber, for example during out of level transportation as well as out of level operation. In some arrangements, the systems, equipment, and methods disclosed hereinafter provide an improved arrangement to institute a rapid blowdown cycle in a gas-liquid separator and air compressor system.

According to some aspects of the disclosure, a gas-liquid separator for separating liquids from pressurized gas is provided. The gas-liquid separator may have a separator tank defining an enclosed wet side chamber and an enclosed dry side chamber. A partition wall may separate the wet side chamber from the dry side chamber. The separator tank may include a tank inlet into the wet side chamber and a tank discharge outlet from the dry side chamber for discharging dry pressurized air. The wet side chamber may be configured to separate and collect liquids from pressurized air that enters through the tank inlet. A separation valve inlet port may connect the wet side chamber with the dry side chamber. The separation valve inlet port may be configured to allow air to pass from the wet side chamber to the dry side chamber and to prevent collected liquids from passing from the wet side chamber to the dry side chamber. A separation valve assembly may be operatively coupled with the separation valve inlet port. The separation valve assembly may be configured to open the separation valve inlet port when pressurized air is forced into the wet side chamber. The separation valve assembly may be configured to close the separation valve inlet port when pressurized air is not being forced into the wet side chamber. In some optional arrangements, the separation valve assembly may be configured to open the separation valve inlet port when a selected pressure point is met and/or exceeded in the wet side chamber. In some optional arrangements, the separation valve assembly may be configured to close the separation valve inlet port when pressure in the wet side chamber drops below a selected pressure point.

According to some aspects of the disclosure, a method of separating liquids from gas with a gas-liquid separator having a wet side chamber and a dry side chamber is provided. A partition wall may separate the wet side chamber from the dry side chamber. A pressurized flow of gas carrying liquid may be received into a wet side chamber. Liquid may be separated from the gas in the wet side chamber. A separation valve may be opened to allow the gas to flow into the dry side chamber of the gas-liquid separator while the pressurized flow of gas is being received within the wet side chamber and meets and/or exceeds the selected pressure point. The air may be exhausted from the dry side chamber through a tank discharge outlet. The separation valve may be closed when the pressurized flow of gas is not being received within the wet side chamber and pressure inside the chamber drops below a selected pressure point.

According to some aspects of the disclosure, an air compressor system is provided. The air compressor system includes an air compressor configured to produce a flow of compressed air and a gas-liquid separator operatively coupled to the air compressor to receive the flow of compressed air. The gas-liquid separator may include any one or more of the features disclosed herein. For example, the gas-liquid separator may include a separator tank having a wet side chamber and a dry side chamber separated by a partition wall. The wet side chamber may receive the flow of compressed air from the air compressor and separate liquid from the compressed air. A separation valve inlet port may connect the wet side chamber with the dry side chamber and allow compressed moist air to flow into the dry side chamber. A tank discharge outlet may be provided from the dry side chamber. A separation valve assembly may be operatively coupled to the separation valve inlet port. The separation valve assembly may be configured to open the separation valve inlet port when the air compressor pump is running and pressure in the wet side chamber has met or exceeded a selected pressure point; and to close the separation valve inlet port when the air compressor is not running and pressure falls below the selected pressure point.

These and other aspects, arrangements, features, and/or technical effects will become apparent upon detailed inspection of the figures and the following description. Any one or more of these aspects may include any one or more of the aspects, arrangements, features, and/or technical effects described hereinafter in any combination and/or arrangement capable of functioning in accordance with the principles set forth herein.

DETAILED DESCRIPTION OF THE INVENTION

The intended purpose of the following detailed description and the phraseology and terminology employed therein is to describe what is shown in the drawings, which include certain nonlimiting embodiments of the invention, describe certain but not all aspects of the disclosed embodiments, and identify certain but not all alternatives of the disclosed embodiments. Therefore, only the appended claims, and not the detailed description, serve to define the scope of the invention(s) disclosed herein.

Figure 1:
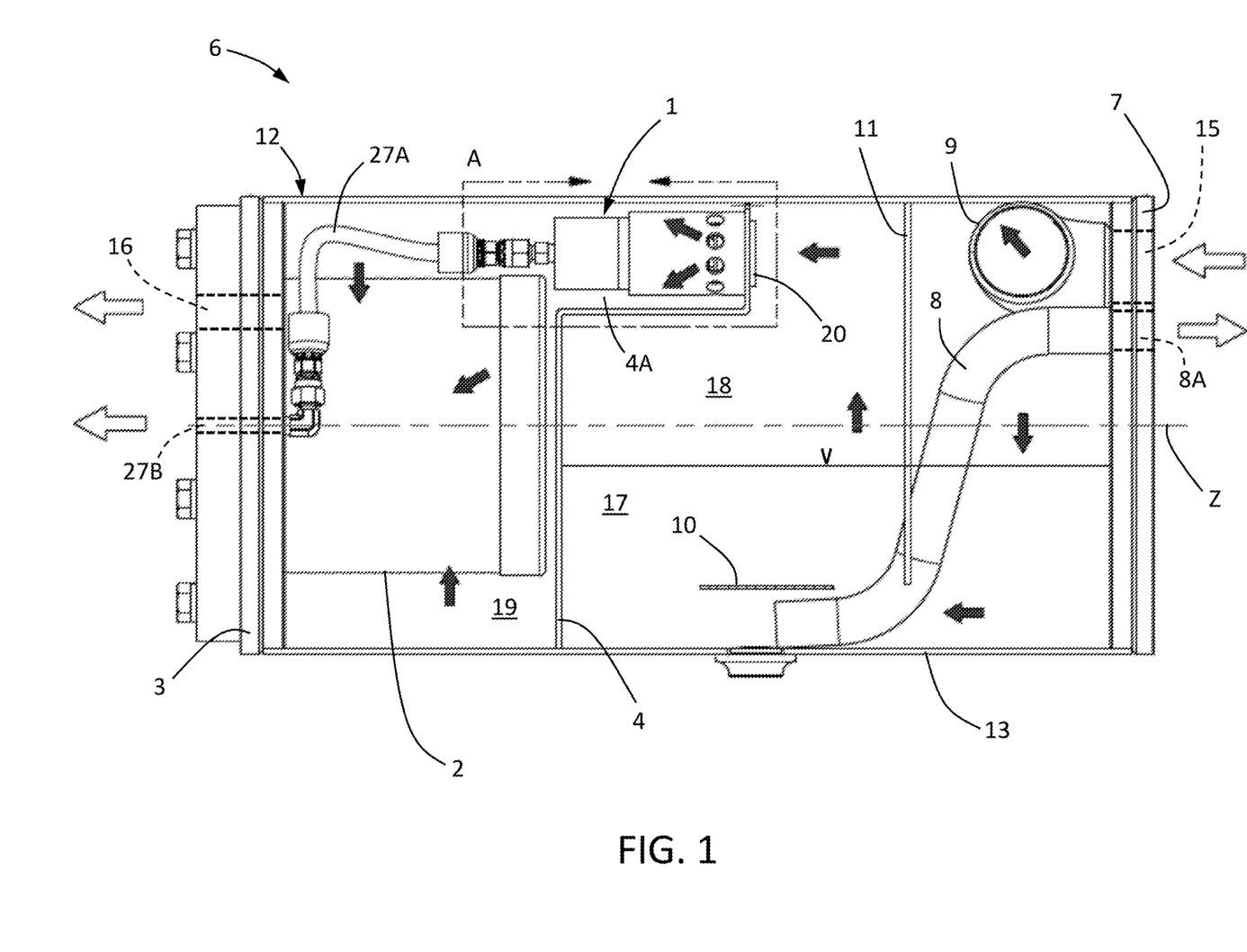
FIG. 1 is an axial cross-sectional view of a gas-liquid separator according to nonlimiting aspects of the present disclosure.

Turning now to the exemplary arrangements of the drawings, FIG. 1 shows a gas-liquid separator 6 that is capable of separating a wide variety of gases and liquids, a particular but nonlimiting example being air and oil discharged from an oil-flooded rotary screw air compressor. The gas-liquid separator 6 includes a separation valve assembly 1 that allows a wet side chamber 18 of a separator tank 12 to be selectively isolated from a dry side chamber 19 of the separator tank 12. For example, the separation valve assembly 1 can isolate the wet side chamber 18 from the dry side chamber 19 during transport of the gas-liquid separator 6 to prevent oil and/or other collected liquids from sloshing into the dry side chamber 19 during transport. The separation valve assembly 1 also may isolate the wet side chamber 18 from the dry side chamber 19 during a blowdown cycle of the compressor system to allow rapid depressurization and a shorter blowdown cycle, thereby enabling a more rapid restart of the compressor system. During operation of the compressor system however, the separation valve assembly 1 may be opened so as to allow movement of air from the wet side chamber 18 of the separator tank 12 into the dry side chamber 19 of the separator tank 12.

The gas-liquid separator 6 is able to make use of a horizontally-oriented separator tank ("horizontal tank") 12, such that the gas-liquid separator 6 is capable of addressing installation issues common with vertical separator tanks when used in certain applications, such as under-deck compressor applications for vehicles, including a wide variety of municipal, emergency and military vehicles. However, the separator tank 12 is not limited to being horizontally oriented, and other arrangements and configurations of the separator tank 12 suitable for separating liquids from a stream of compressed gas may be used. The following discussion will refer to the use of the gas-liquid separator 6 to separate air and oil; however, it should be understood that the invention is not limited to operations on these two fluids and may also be used to separate other gases from other liquids.

In the exemplary arrangement of the drawing, the separator tank 12 has a substantially tubular-shaped sidewall 13 that defines an axis Z and an interior that is closed by a wet side endplate 7 and a dry side endplate 3 disposed at opposite ends of the tank sidewall 13. A partition wall 4 divides the interior of the separator tank 12 into an enclosed wet side chamber 18 and an enclosed dry side chamber 19. The partition wall 4 spans generally transversely entirely across the interior of the separator tank 12 and is sealed to the interior perimeter of the sidewall 13 to prevent air and liquid from traveling from the wet side chamber 18 to the dry side chamber 19 except through a separation valve inlet port 20, such as a passage through the partition wall 4. The partition wall 4 may take any arrangement sufficient to mechanically separate the wet side chamber 18 from the dry side chamber 19. In this arrangement, the partition wall 4 is a generally flat vertical wall panel with a recessed pocket near the top. Under typical use, the tank axis Z is oriented generally horizontally, and the partition wall 4 is oriented generally vertically. However, the partition wall 4 may include multiple panels, multiple walls, different shapes, and/or be oriented differently as long as it mechanically separates the wet side chamber 18 from the dry side chamber 19 in accordance with the separation purposes described herein.

A tank inlet 15 allows a high velocity, high pressure flow of wet air, such as a mixture of air and oil from an air compressor 28 of an air compressor system (FIG. 4), to enter into the wet side chamber 18 of the separator tank 12. The tank inlet 15 is disposed through the wet side endplate 7. However, the tank inlet may be located in other places as long as it provides for a flow of pressurized air into the wet side chamber 18. Movement of the flow of wet air within the wet side chamber 18 of the separator tank 12 causes most of the oil or other liquid to separate out from the air in a primary separation stage while in the wet side chamber 18.

The separated oil or other liquid falls out and collects in a liquid sump area 17 at or generally near the bottom of the wet side chamber 18 in a manner generally understood in the art. In this arrangement, the primary separation stage uses a cyclone-type separation configuration facilitated by a tank inlet elbow 9 and one or more separation baffles 11. The tank inlet elbow 9 is connected to the tank inlet 15 and directs the incoming flow of wet air tangentially toward the interior perimeter of the tank sidewall 13. Centrifugal forces of the flow of wet air against the interior surface of the tank sidewall 13 cause the oil or other liquid entrained within the air to separate out and fall into the liquid sump area 17. The separation baffle(s) 11 further facilitates separation of the oil or other liquid from the air. In this example, the separation baffle 11 extends partly across the interior of the separator tank 12 inside the wet side chamber 18 and is arranged to promote the centrifugal motion of the wet air around the inner surface of the tank sidewall 13. However, other types of gas-liquid separation configurations may be utilized and/or other arrangements of separation baffles 11 and/or air directing devices may be used to facilitate the primary stage separation of the oil or other liquids from the air. After cycling through the primary separation stage in the wet side chamber 18, most of the oil has separated out from the air, and a flow of moist air flows through the separation valve inlet port 20 and enters the dry side chamber 19. The separation valve inlet port 20 in this arrangement is disposed through the partition wall 4. However, the separation valve inlet port 20 may be disposed in other locations suitable to channel air from the wet side chamber 18 into the dry side chamber 19 while preventing oil (or other liquids) in the liquid sump area 17 from spilling into the dry side chamber 19. Once in the dry side chamber 19, the moist air flows through a separator element 2 and from there out of the separator tank 12 through a tank discharge outlet 16. The separator element 2 may take any suitable form for separating out any remaining entrained oil or other moisture and/or other liquid from the moist air to provide dry air with a suitably low moisture and/or oil content therein. For example, the separator element 2 may include one or more screens, meshes, or other filtration barriers through which the moist air can travel and that separate out moisture from the air in any suitable manner. In the present example, the separator element 2 is an outside-in separator, meaning air enters the separator element 2 from the exterior of the filtration barriers. However, other types of separator elements may be used. Oil or other liquids collected in a liquid sump area 17 can be returned to the air compressor 28 or otherwise removed from the liquid sump area 17 through any convenient drain or return line, for example through a pick-up tube 8. A baffle plate 10 is optionally disposed above the entrance into the pick-up tube 8 and at a height within the wet side chamber 18 so as to typically be located below or near the surface of the collected oil or other liquid in the liquid sump area 17 to reduce aeration of the oil or other liquid being collected by the pick-up tube 8 in the liquid sump area 17.

The separation valve assembly 1 is operatively coupled with the separation valve inlet port 20 to isolate the wet side chamber 18 from the dry side chamber 19 when the compressor system is not active. The separation valve assembly 1 includes a separation valve 21 that opens and closes the separation valve inlet port 20 depending upon the operating state of the air compressor system. The separation valve 21 opens the separation valve inlet port 20 when the air compressor system is active so that the moist air can travel from the wet side chamber 18 into the dry side chamber 19. When the compressor system is inactive, the separation valve 21 closes the separation valve inlet port 20, thereby preventing any oil or other liquid from passing through the separation valve inlet port 20 from the wet side chamber 18 into the dry side chamber 19. In this way, the separation valve 21 isolates the wet side chamber 18 from the dry side chamber 19 when compressed air is not being circulated through the separator tank 12, and thereby prevents oil or other liquids from transferring into the dry side chamber 19 during transport of the gas-liquid separator 6. The separation valve 21 in the nonlimiting embodiment shown in the drawings is represented as a spring-actuated valve that opens and closes automatically at a selected pressure point in response to a differential in the pressures between the wet side chamber 18 and the dry side chamber 19. However, in other arrangements, the separation valve 21 may have other types of actuation, such as an electrical actuation with a valve body including a solenoid actuator or a pilot valve system that opens and closes the separation valve 21, a simple pressure differential type valve, or a manual actuation valve. Preferably, the separation valve 21 actuates automatically in response to compressed air being circulated through the separator tank 12, such as when turning the air compressor system on and off; however, such automatic actuation is not necessary.

Figure 2:
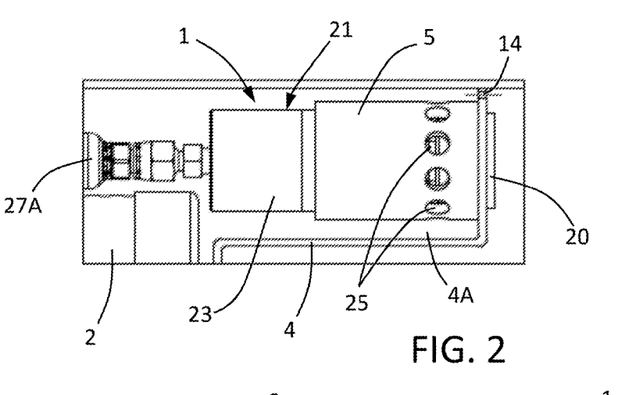
FIG. 2 is an enlarged view of a detail A in FIG. 1 that includes a separation valve assembly of the gas-liquid separator shown in FIG. 1.
Figure 3:
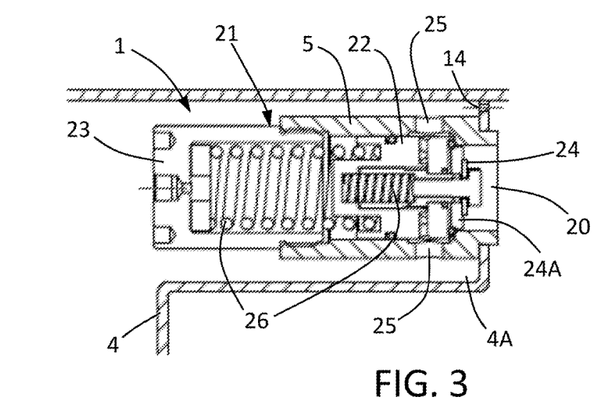
FIG. 3 is an enlarged axial cross-sectional view of the separation valve assembly of FIGS. 1 and 2.

FIGS. 2 and 3 show one exemplary valve arrangement that may be implemented for the separation valve 21. In this arrangement, the separation valve 21 includes a valve cap 23, a valve body 22, and a valve member, such as a valve disk 24, which interact to open and/or close the separation valve inlet port 20. The valve cap 23 threads into a separation valve housing 5, which surrounds the separation valve inlet port 20 and extends through the partition wall 4 into the dry side chamber 19. One or more moist air outlets 25 extend radially through the separation valve housing 5. The valve body 22 and valve disk 24 are disposed within the separation valve housing 5 and are adapted to shift relative to the separation valve housing 5 between an open position and a closed position to open and/or close the separation valve inlet port 20 as well as the moist air outlets 25, respectively, relative to the wet side chamber 18. The valve body 22 is operatively coupled to the valve disk 24 to shift the separation valve 21 between the open and closed positions. The valve body 22 may be activated in any suitable way, such as manually with a manual actuator, manually or automatically with an external electrical or pneumatic signal, or automatically with a spring system responsive to pressure differentials within the separator tank 12. In this arrangement, the valve body 22 is responsive to pressure inside the wet side chamber 18 such that the separation valve 21 automatically opens when the pressure inside the wet side chamber 18 rises above a selected pressure and automatically closes when the pressure inside the wet side chamber 18 falls below the selected pressure. The valve body 22 is a resilient member, which may be directly coupled to internal spring(s) 26, arranged to allow the separation valve 21 to move to the open position once a selected pressure is reached and to automatically re-close the separation valve 21 when the pressure falls below the selected pressure point. In a normal state, the valve disk 24 is sealed against a valve seat 24A when the internal pressure of the wet side chamber 18 is below the selected point of the separation valve 21. When the internal pressure in the wet side chamber 18 reaches the selected pressure point, such as after the air compressor system is turned on and blowing compressed air and oil (or other liquid) into the wet side chamber 18, the valve body 22 and the valve disk 24 compress the internal valve spring(s)

26 and allow air to pass through the separation valve inlet port 20 and out through the moist air outlets 25. The separation valve 21 will remain open until the pressure in the wet side chamber 18 drops below the selected pressure point. After the pressure of the wet side chamber 18 drops below the selected pressure point, such as when the air compressor 28 is turned off and the system has begun the blowdown cycle, the internal valve spring(s) 26 push the valve disk 24 and valve body 22 back against the valve seat 24A, thereby closing off the moist air outlets 25 and the separation valve inlet port 20. However, other actuation arrangements for the separation valve 21 may also be used. With this particular separation valve assembly 1, a portion the valve cap 23 is vented to ambient air pressure to operate correctly, which in this arrangement is provided by a hose 27A that fluidically couples the valve cap 23 to a vent port 27B to allow the valve disk 24 and the valve body 22 to move internally of the separation valve assembly 1. However, this venting arrangement may not be necessary with other types of valves. The size of the separation valve inlet port 20 and the size and number of the moist air outlets 25 preferably are selected to have an effective cross-sectional area large enough to allow air to move from the wet side chamber 18 into the dry side chamber 19 without increasing velocity of the air/oil (or other liquid) mixture enough to cause oil (or other liquid) to transfer from the liquid sump area 17 to the dry side chamber 19, or to create too large of a pressure drop between the wet side chamber 18 and the dry side chamber 19.

Figure 4:
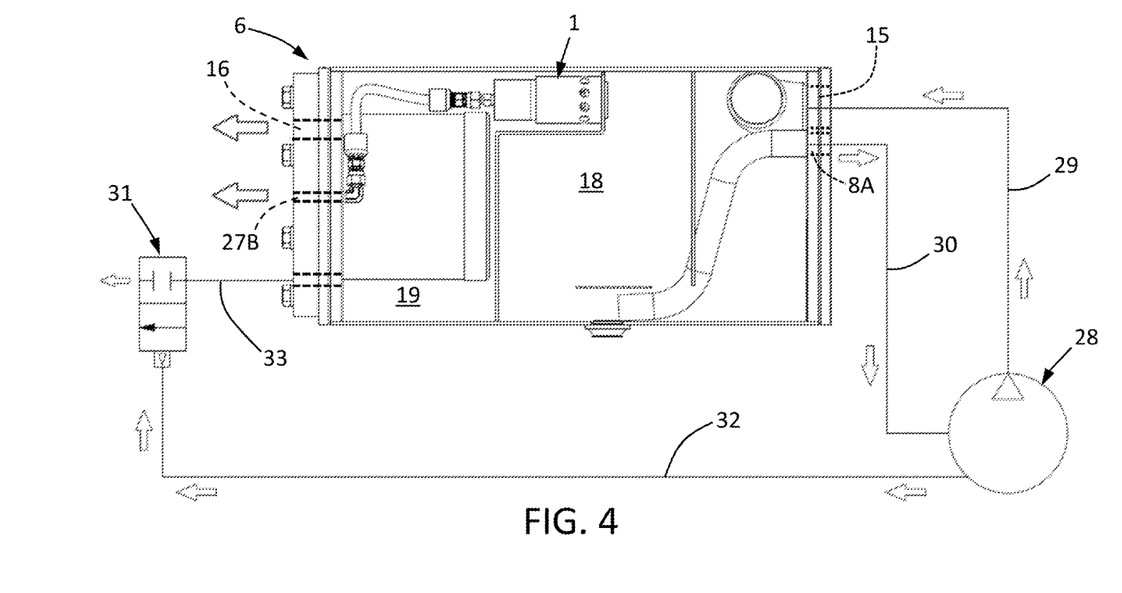
FIG. 4 is a schematic view of an air compressor system including the gas-liquid separator of FIG. 1.

A blowdown valve and/or blowdown orifice 31 (hereinafter, these and functional equivalents are simply referred to as a blowdown device 31 as a matter of convenience) is operatively coupled with the separator tank 12 and configured to rapidly release air pressure within the separator tank 12 during the blowdown cycle after the air compressor 28 has been turned off. The blowdown device 31 is configured to release pressure from within the separator tank 12 when the separation valve inlet port 20 is closed. In this exemplary arrangement, the blowdown device 31 is coupled to the air compressor 28 by a pilot line 32 or any other suitable means of conveying an appropriate control input, and coupled to the dry side chamber 19, for example, by a pneumatic line 33. A silencer (not shown) may be coupled with the blowdown device 31 and/or blowdown orifice to reduce noise of air exiting through the blowdown device 31 and/or orifice. The blowdown device 31 is configured to remain shut during operation of the air compressor system and to open during the blowdown cycle after the air compressor system is turned off. In this way, pressure inside the separator tank 12 is dissipated to the surrounding ambient environment during the blowdown cycle almost immediately. Due to the presence of an orifice 14 that is open to both the wet side chamber 18 and the dry side chamber 19, pressure will be relieved from the wet side chamber 18 into the dry side chamber 19 before pressure is eventually relieved to the surrounding ambient environment. Bubbles may form within the oil or other liquids resulting in foam created in the wet side chamber 18 due to this rapid depressurization. However, due to the mechanical separation of the wet side chamber 18 and the dry side chamber 19 through the separation valve inlet port 20 as a result of the separation valve assembly 1, these bubbles or foam will be unable to transfer from the wet side chamber 18 to the dry side chamber 19. Due to the location and size of the orifice 14, any bubbles or foam created within the oil or other liquids will also be unable to transfer from the wet side chamber 18 to the dry side chamber 19 through the orifice 14. This rapid depressurization allows, for example, an air compressor system to be restarted much more rapidly without endangering the compressor drive and/or mechanical components of the air compressor 28. In the present exemplary arrangement, as best seen in FIG. 4, the blowdown device 31 is external of the gas-liquid separator 6 and arranged to shut when the air compressor 28 is turned on. The blowdown device 31 is configured to only open when the air compressor system is turned off. The blowdown device 31 is connected directly with both the ambient environment and the dry side chamber 19 of the separator tank 12. Thus, the blowdown device 31 allows pressure to be released from the separator tank 12 rapidly and/or immediately. However, other arrangements that release the pressure from inside the dry side chamber 19 to the surrounding ambient atmosphere without releasing pressure from inside the wet side chamber 18 as quickly may be used. The blowdown device 31 may be actuated in any suitable manner to function as described herein. For example, the device 31 may be a pilot operated valve and/or orifice that opens and closes in response to changes in pressure within the wet side chamber 18 and/or the dry side chamber 19. In the present exemplary arrangement, the blowdown device 31 is a pilot operated valve that opens when pressure in the pilot line 32 increases which happens when the air compressor 28 is turned off. In other arrangements, the device 31 may be actuated from external electrical or pneumatic signal, such as may be generated when the air compressor system is switched on and/or off and/or may include a solenoid actuator. In some arrangements, the blowdown device 31 may be configured to selectively release pressure from within the separator tank 12 when the separation valve inlet port 20 is open. Having the wet side chamber 18 mechanically separated from the dry side chamber 19 during the blowdown cycle allows the separator tank 12 to be depressurized immediately without foam bubbles or other liquids being transferred into the dry side chamber 19 from the wet side chamber 18 of the separator tank 12.

The separation valve inlet port 20 preferably is located in an upper portion of the wet side chamber 18 so as to be located above the liquid sump area 17 or other surface of collected oil or other liquid in the bottom area of the wet side chamber 18. In this arrangement, the separation valve inlet port 20 is located near the top of the partition wall 4, well above the axis Z of the separator tank 12. The separation valve inlet port 20 is defined in a portion of the partition wall 4 forming a recess or compartment 4A that protrudes into the wet side chamber 18. The separation valve assembly 1 is disposed in the compartment 4A on the dry side chamber 19 side of the partition wall 4. However, other arrangements for the separation valve inlet port 20 are possible. For example, in a gas-liquid separator with a vertically oriented separator tank 12, the separation valve inlet port 20 might be located anywhere through the partition wall 4. In yet other configurations, the separation valve inlet port 20 may be a channel that circumvents the partition wall 4, such as through the tank sidewall 13.

The orifice 14 is configured to allow air pressure inside the wet side chamber 18 to dissipate in a controlled manner into the dry side chamber 19 during the blowdown cycle when the separation valve assembly 1 is closed. The orifice 14 extends through the partition wall 4 and is located above the separation valve assembly 1 (relative to the horizontal) near the top of the separator tank 12 in order to prevent collected liquid in the bottom of the wet side chamber 18 from spilling into the dry side chamber 19. This location of the orifice 14 also allows the gas-liquid separator 6 to operate and/or be transported at high angles without oil and/or other liquids spilling into the dry side chamber 19 of the separator tank 12. The size of the orifice 14 may be selected so as to control the rate of pressure dissipation to prevent excessive bubbling and/or foam creation of the oil or other liquids in the wet side chamber 18 during the blowdown cycle. The orifice 14 preferably has a smaller cross-sectional area, i.e., the total area through which gases and liquids can flow, than the separation valve inlet port 20 and the separation valve assembly 1 when open so that the orifice 14 provides greater resistance to moist air passing through than the open separation valve inlet port 20 and the separation valve assembly 1. Preferably, the orifice 14 is relatively small in order to prevent oil and/or other liquids from transferring into the dry side chamber 19 from the wet side chamber 18 during transport or operation. In other arrangements, the orifice 14 may be omitted and/or more than one such orifice 14 may be provided in other configurations.

In some arrangements, more than one blowdown device 31 may be provided and/or used to further control the relief of pressure inside the separator tank 12 and the rate of the blowdown cycle. In such an arrangement, a secondary blowdown device 31 may be selected to control release of pressure from the wet side chamber 18 independently of the dry side chamber 19 at a selected maximum rate in any way understood in the art.

In some arrangements, multiple separation valve assemblies 1 may be directly coupled to additional separation valve inlet ports 20 defined in a portion of the partition wall 4, which in the nonlimiting embodiment shown in the drawings comprises the compartment 4A that protrudes into the wet side chamber 18. The additional separation valve assemblies 1 may be disposed in the compartment 4A of the partition wall 4 in the dry side chamber 19. In the present example, the additional separation valve assemblies 1 is/are shown as a spring-loaded type valve configured to automatically open when the pressure inside of the wet side chamber 18 meets or exceeds the selected pressure point as would occur after the air compressor system is turned on. The additional separation valve assemblies 1 is/are also configured to automatically close when the pressure in the wet side chamber 18 drops below the selected pressure point. However, other types of separation valve assemblies 1 may be used, or the additional separation valve assemblies 1 may be omitted. With this arrangement, the separation valve inlet port and/or ports 20 can be completely closed during transport of the gas-liquid separator 6, thereby preventing any oil or other liquid from transferring into the dry side chamber 19 during transport or even when the separator tank 12 is disposed out of level or the wet side chamber 18 is over filled.

FIG. 4 illustrates an exemplary air compressor system incorporating the gas-liquid separator 6. An air compressor 28 is operatively coupled with the gas-liquid separator 6 by a supply line 29. The air compressor 28 produces a flow of compressed air, which is directed by the supply line 29 to the tank inlet 15 through the tank inlet elbow 9 into the wet side chamber 18 of the separator tank 12. The air compressor 28 may be any suitable type of air compressor. In the present example, the air compressor 28 is an oil-flooded rotary screw air compressor. However, other types of compressors may be used. In this arrangement, the air compressor 28 forces a flow of wet compressed air into the wet side chamber 18 of the gas-liquid separator 6. Optionally, liquid from the liquid sump area 17 in the wet side chamber 18 can be collected with the pick-up tube 8 and delivered via a return line 30 connected to an outlet 8A of the tube 8 for reuse by the air compressor 28. This air compressor system is for example purposes only, and the gas-liquid separator 6 is not limited to being used in this arrangement, but rather may be used in other air compressor systems and/or other arrangements and systems where it is desired as to separate liquids from a pressurized flow of gases.

In operation, when the air compressor system is turned on, wet air from the air compressor 28 enters the tank inlet 15 into the wet side chamber 18 by way of the tank inlet elbow 9, thereby pressurizing the wet side chamber 18. Simultaneously, the separation valve 21 is opened, either in response to an external signal or in response to the increased pressure inside the wet side chamber 18, thereby allowing moist air to travel from the wet side chamber 18 into the dry side chamber 19 and eventually out of the tank discharge outlet 16 to a compressed air line, work piece, or other end-user mechanism. A substantial amount of liquid in the wet compressed air is separated out from the flow of pressurized air in the wet side chamber 18, for example by centrifugal forces and/or with one or more separation baffles 11, and moist air is transferred from the wet side chamber 18 into the dry side chamber 19 through the separation valve inlet port 20 and the open valve assembly 1. The moist air then travels through the separator element 2 where additional moisture and/or oil or other liquid is removed from the air, and pressurized dry air exits the separator tank 12 from the dry side chamber 19 through the tank discharge outlet 16. While the air compressor 28 is in operation, the blowdown device 31 remains closed, thereby preventing air inside the dry side chamber 19 from escaping to ambient surroundings. When the air compressor system is turned off, the system enters into the blowdown cycle and the blowdown device 31 opens to allow pressure inside the separator tank 12 to escape to the ambient surroundings. When the pressure inside the wet side chamber 18 drops below the selected pressure point, the separation valve 21 closes. Meanwhile, in arrangements that include the orifice 14 pressure inside the wet side chamber 18 dissipates through the orifice 14 to the dry side chamber 19 and eventually escapes to ambient pressure through the blowdown device 31. In this state, with the separation valve 21 closed, the gas-liquid separator 6 can be transported without oil or other liquids from the wet side chamber 18 transferring in any significant amount into the dry side chamber 19. Further, because the separator tank 12 is very rapidly depressurized, the entire air compressor system can be restarted much sooner without risk of damage to the compressor drive or other mechanical components.

The gas-liquid separator 6 including the separation valve assembly 1 can thereby reduce or eliminate unwanted movement of liquid, such as oil collected in the liquid sump area 17, transferring into the dry side chamber 19 during transport of the gas-liquid separator 6. The separation valve assembly 1 may also prevent unwanted movement of liquid into the dry side chamber 19 in situations where the separator tank 12 is disposed out of level and/or situations the system is over filled with oil or other liquids. In addition, the separation valve assembly 1 in some arrangements may allow for a much faster blowdown cycle and thereby allow more rapid restart of the air compressor system. Some or all of these benefits may be realized from different arrangements and combinations of the various features described with respect to the drawings.

This detailed description and the drawings of the exemplary embodiments are to be construed as examples only and do not describe every possible embodiment or combination of features. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

The invention claimed is:

1. A gas-liquid separator comprising:
   a separator tank defining an enclosed wet side chamber and an enclosed dry side chamber;
   a partition wall separating the wet side chamber from the dry side chamber;
   a tank inlet into the wet side chamber, wherein the wet side chamber is configured to separate and collect liquids from pressurized air that enters through the tank inlet;
   a separation valve inlet port connecting the wet side chamber with the dry side chamber, the separation valve inlet port configured to allow air to pass from the wet side chamber to the dry side chamber and to prevent collected liquids from passing from the wet side chamber to the dry side chamber;
   a tank discharge outlet from the dry side chamber for discharging dry pressurized air; and
   a separation valve assembly operatively coupled with the separation valve inlet port, wherein the separation valve assembly is configured to open the separation valve inlet port when pressurized air is forced into the wet side chamber and pressure inside the wet side chamber reaches or exceeds a selected pressure, and wherein the separation valve assembly is configured to close the separation valve inlet port when pressurized air is not being forced into the wet side chamber and pressure inside the wet side chamber drops below the selected pressure.

2. The gas-liquid separator of claim 1, wherein the separation valve assembly comprises a separation valve configured to open and close the separation valve inlet port.

3. The gas-liquid separator of claim 2, wherein the separation valve comprises a resilient member that opens a valve member when the pressure in the wet side chamber reaches or exceeds the selected pressure and closes the valve member when the pressure in the wet side chamber drops below the selected pressure.

4. The gas-liquid separator of claim 3, wherein the separation valve comprises an electric solenoid actuator that opens and closes the valve member.

5. The gas-liquid separator of claim 3, wherein the separation valve comprises a manual actuator that opens and closes the valve member.

6. The gas-liquid separator of claim 3, wherein the separation valve comprises a pneumatic actuator that opens and closes the valve member.

7. The gas-liquid separator of claim 3, wherein the separation valve comprises a hydraulic actuator that opens and closes the valve member.

8. The gas-liquid separator of claim 2, wherein the separation valve is configured to automatically open the separation valve when pressure in the wet side chamber rises above a preselected selected pressure.

9. The gas-liquid separator of claim 2, wherein the separation valve is configured to automatically close the separation valve when pressure in the wet side chamber drops below a preselected selected pressure.

10. The gas-liquid separator of claim 1, further including a blowdown device configured to selectively release pressure from within the separator tank when an air compressor system associated with the gas-liquid separator is turned off.

11. The gas-liquid separator of claim 10, wherein the blowdown device is configured to selectively release pressure from within the separator tank when the separation valve inlet port is closed.

12. The gas-liquid separator of claim 10, wherein the blowdown device is configured to selectively release pressure from within the separator tank when the separation valve inlet port is open.

13. The gas-liquid separator of claim 10, wherein the blowdown device remains closed when the air compressor system is turned off.

14. The gas-liquid separator of claim 11, wherein the blowdown device comprises a blowdown valve that is operated by a manual actuator.

15. The gas-liquid separator of claim 11, wherein the blowdown device comprises a blowdown valve that is operated by a pneumatic actuator.

16. The gas-liquid separator of claim 11, wherein the blowdown device comprises a blowdown valve that is operated by a hydraulic actuator.

17. The gas-liquid separator of claim 11, wherein the blowdown device comprises a blowdown valve that is operated by an electric solenoid or actuator.

18. The gas-liquid separator of claim 11, wherein the blowdown device comprises a blowdown valve that is operated automatically by a signal or actuator from a pressure differential within the air compressor system.

19. The gas-liquid separator of claim 12, wherein the blowdown device comprises a blowdown valve that is operated by a manual actuator.

20. The gas-liquid separator of claim 12, wherein the blowdown device comprises a blowdown valve that is operated by a pneumatic actuator.

21. The gas-liquid separator of claim 12, wherein the blowdown device comprises a blowdown valve that is operated by a hydraulic actuator.

22. The gas-liquid separator of claim 12, wherein the blowdown device comprises a blowdown valve that is operated by an electric solenoid or actuator.

23. The gas-liquid separator of claim 12, wherein the blowdown device comprises a blowdown valve that is operated automatically by a signal or actuator from a pressure differential within the air compressor system.

24. The gas-liquid separator of claim 1, further comprising an orifice connecting the wet side chamber with the dry side chamber, wherein the orifice has a smaller effective cross-sectional area than the separation valve inlet port.

25. The gas-liquid separator of claim 10, further comprising multiple separation valve assemblies directly coupled to separation valve inlet port(s) to allow moist air to transfer from the wet side chamber to the dry side chamber during operation and the air compressor system is turned on.

26. The gas-liquid separator of claim 1, wherein the separation valve inlet port is disposed through the partition wall; and
   a liquid sump area located near the bottom of the wet side chamber that receives liquids separated from the air, wherein the separation valve inlet port is disposed above the liquid sump area to prevent liquids from the liquid sump area from passing into the dry side chamber.

27. The gas-liquid separator of claim 1, further comprising at least one separation baffle disposed in the wet side chamber and configured to separate liquids from the pressurized air.

28. The gas-liquid separator of claim 1, further comprising a tank inlet elbow coupled to the tank inlet and configured to direct incoming flow of wet air from the tank inlet tangentially toward an interior perimeter of the wet side chamber along a tank sidewall.

29. The gas-liquid separator of claim 1, further comprising a separator element disposed in the dry side chamber, wherein the tank discharge outlet is spaced apart from the separation valve inlet port, and wherein air received through the separation valve inlet port flows through the separator element before exiting through the tank discharge outlet.

30. A method of separating liquids from gas by using the gas-liquid separator of claim 2, the method comprising:
receiving a pressurized flow of gas carrying liquid into the wet side chamber;
separating the liquid from the gas in the wet side chamber;
opening the separation valve to allow the gas to flow into the dry side chamber of the gas-liquid separator while the pressurized flow of gas is being received within the wet side chamber;
exhausting the air from the dry side chamber through the tank discharge outlet; and
closing the separation valve when the pressurized flow of gas is not being received within the wet side chamber and pressure inside the wet side chamber is below the selected pressure.

31. An air compressor system comprising the gas-liquid separator of claim 1, the air compressor system comprising:
an air compressor configured to produce a flow of compressed air;
wherein the gas-liquid separator is operatively coupled to the air compressor to receive the flow of compressed air;
wherein the wet side chamber receives the flow of compressed air from the air compressor and separates fluids from the compressed air; and
wherein the separation valve assembly opens the separation valve inlet port when the air compressor is running and pressure in the wet side chamber has met or exceeded the selected pressure and closes the separation valve inlet port when the air compressor is not running and pressure in the wet side chamber falls below the selected pressure.

* * * * *